United States Patent [19]

Vogel et al.

[11] Patent Number: 4,969,106
[45] Date of Patent: Nov. 6, 1990

[54] COMPUTERIZED METHOD OF DETERMINING SURFACE STRAIN DISTRIBUTIONS IN A DEFORMED BODY

[75] Inventors: Jeffrey H. Vogel, Troy; Daeyong Lee, Loudonville, both of N.Y.

[73] Assignee: CamSys, Inc., Troy, N.Y.

[21] Appl. No.: 316,232

[22] Filed: Feb. 27, 1989

[51] Int. Cl.$^5$ .............................................. G06K 9/00
[52] U.S. Cl. .................................... 364/508; 364/559; 382/8
[58] Field of Search ................ 364/508, 514, 525, 559; 73/800, 826; 382/8; 250/492.1; 356/32, 35.5

[56] References Cited

U.S. PATENT DOCUMENTS

| | | | |
|---|---|---|---|
| 4,139,302 | 2/1979 | Hung et al. | 356/32 |
| 4,288,852 | 9/1981 | Holland | 364/508 |
| 4,360,885 | 11/1982 | Edgar | 364/525 |
| 4,591,996 | 5/1986 | Vachon | 364/508 |
| 4,598,420 | 7/1986 | Harvey | 382/8 |
| 4,663,732 | 5/1987 | Robinson | 364/900 |
| 4,682,892 | 7/1987 | Chawla | 356/35.5 |
| 4,686,631 | 8/1987 | Rund | 364/508 |
| 4,759,072 | 7/1988 | Yamane et al. | 382/8 |
| 4,841,779 | 6/1989 | Mitsuhashi et al. | 73/826 |

OTHER PUBLICATIONS

The Evaluation of Large Strains from Industrial Sheet Metal Stampings with a Square Grid, *J. of Applied Metal Working*, vol. 4, 1986, pp. 143–156.
Strain Measurement of Structures With Curved Surface by Means of Personal Computer–Based Picture Processing, A. Miyoshi, et al., *Engineering With Computers*, vol. 3, 1988, pp. 149–156.
GM–Balance Engineering Brochure on Portable Grid Circle Analyzer (date unknown).
MTS–The Optical Grid Analyzer Model 637 (date unknown).

*Primary Examiner*—Parshotam S. Lall
*Assistant Examiner*—Ellis B. Ramirez
*Attorney, Agent, or Firm*—Notaro & Michalos

[57] ABSTRACT

A method and apparatus for measuring strain distribution on a deformed surface utilizes a video or photographic camera for taking two images of the surface which are taken at an angle to each other. The surface carries a deformed grid which has grid points that are digitized using images from the camera. The digitized points each form one set of two-dimensional coordinates. Each point of the one set of coordinates is correlated with a corresponding point of the other set. The two sets of two-dimensional coordinates are then used in conjunction with the geometrical relationship between the images to calculate a single set of three-dimensional coordinates for the grid points. The three-dimensional coordinates are then used in groups of three adjacent points to calculate strain over the surface.

21 Claims, 7 Drawing Sheets

COMPUTERIZED METHOD OF DETERMINING SURFACE STRAIN DISTRIBUTIONS IN A DEFORMED BODY

STATEMENT OF GOVERNMENT INTEREST

This invention was partly made with Government support under Grant No. DMC-8415309 awarded by the National Science Foundation. The Government has certain rights in this invention.

FIELD AND BACKGROUND OF THE INVENTION

The present invention relates in general to methods and equipment for characterizing objects that have been made by deforming sheet material, and in particular to a new and useful computerized method of determining the surface strain distribution in such a deformed object.

A wide variety of objects are made using sheet metals and plastics that are deformed into a final shape. Examples include automobile fenders, dishwasher casings, kitchen sinks, beer cans, soft drink containers and plastic cups. During the manufacturing stage of such objects or products, it is necessary to know how the material has deformed at all locations and during every stage of the deformation. This includes the stretching, drawing or pulling of the material to form the final shape. There is a two-fold reason why this information is necessary. Firstly, this information is needed to ensure the product has uniform quality. Substantially uniform sheet thickness throughout the deformed object is desirable for example. The other reason is to assess the potential for local failure or fracture over different areas of the object.

Devices and methods are known for assessing the distribution of strain or deformation in objects that have been formed from flat sheets of material. The Balanced Engineering Corporation, markets a portable grid circle analyzer which utilizes a hand held digital camera that scans a circular grid that was placed on the surface of the sheet material before deformation. The circles which have been deformed into ellipses are mathematically analyzed to determine strain in each area on the deformed object. A similar product is available from MTS which is designated the Model 637 Optical Grid Analyzer.

Both of these devices are exceeding expensive to purchase.

Another system is described in a paper by E. Schedin and A. Melander entitled "The Evaluation of Large Strains from Industrial Sheet Metal Stampings with a Square Grid" (*J. of Applied Metal Working*, Vol. 4, 1986, pp. 143–156). This system is based on locating points instead of circle dimensions but uses a single view and requires a large amount of user interaction for each strain point calculation, just as required in the grid circle analyzer devices.

One system is disclosed in "Application of Stereophotogrammetic Methods to Analyze Kinematics and Dynamics of Shells" by T. Bednarski, Instytut Technologii Bezwiorowych, Politechniki Warszawskiej, 1977 (which is in Polish). This system appears to utilize two cameras to make strain measurements during the formation of an object. The details of this disclosure are not clear however.

U.S. Pat. Nos. 3,552,856 and 4,722,600 disclose methods for measuring strain using X and Y coordinate fringes to provide two or one dimensional strain analysis.

Other imaging techniques are shown in U.S. Pat. Nos. 4,115,806; 4,205,973; 4,508,452; 4,634,279; 4,645,347 and 4,657,394.

Another article which is relevant for its teaching of the use of two camera angles, is entitled "Strain Measurement of Structures with Curved Surface by Means of Personal Computer-Based Picture Processing", by A. Miyoshi, et al. (*Engineering With Computers*, Vol. 3, 1988, pp. 149–156).

One major drawback of all known systems for measuring strain in sheets, is that at most one strain value is obtained per measurement. According to the present invention, hundreds of strain values can be produced over a significant region of a part being tested, with just two measurements being taken.

SUMMARY OF THE INVENTION

The present invention comprises an automated strain measuring system which fills a very important need in the efforts to develop analytical tools for die design. In addition, the strain measurements made in accordance with the present invention are indispensable tools in the trouble shooting of actual production failures, helping engineers to distinguish, for example, between failures caused by a change in forming conditions and those due to variations in material properties. The automated measuring system of the invention offers significant advantages over existing technology in the ease with which large amounts of data can be obtained and presented.

According to the invention, hundreds of strain values can be obtained over a significant area of the part to be tested, with just two measurements.

The method of the present invention measures strain distribution over a deformed surface by applying a grid pattern having grid points, to the surface, which pattern is deformed by deformation of the surface. The grid pattern may be applied before the part is deformed. Alternatively, the grid pattern may be applied after deformation takes place, for example by projecting the grid pattern onto the deformed surface.

Two images of the deformed surface are then taken which are at an angle to each other so that two views of the deformed surface are obtained. These two views are then digitized either using a manual technique or an automatic video technique. Digitization yields two sets of two-dimensional coordinates for the digitized grid points, one for each image.

The points of the two sets are then correlated so that each point of one image is identified with a corresponding point of the other image.

Using the angle between the two images, a set of three-dimensional coordinates can be calculated for each of the grid points.

The single set of three-dimensional coordinates can then be used in sets of three adjacent grid points to calculate strain over the entire surface of interest. This yields a strain distribution over the deformed surface.

An apparatus which is used in accordance with the present invention includes a video camera which can be aimed at a specimen to be measured, provided on a rotary table. Articulation of the video camera and the rotary table are through encoders so that angle measurements can be taken.

The video camera is connected to a microcomputer which is programmed with algorithms which capture, digitize and refine the grid to establish one two-dimensional coordinate set. The turntable may then be rotated through a measured angle and a second view captured, digitized and refined. The second view is used to establish the second two-dimensional coordinate set which is used in conjunction with the first set and with the measured angle to calculate the three-dimensional coordinate set.

Additional algorithms in the microcomputer are then utilized to smooth the geometry and calculate the strain over the surface for which images have been taken. The strain can then be displayed as strain contours over the surface.

The present invention thus provides a method and apparatus for measuring strain distribution over a deformed surface which is relatively simple and economical in design and operation, while yielding large amounts of information concerning the deformed surface.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

DESCRIPTION OF THE PREFERRED EMBODIMENTS

Figure 1:
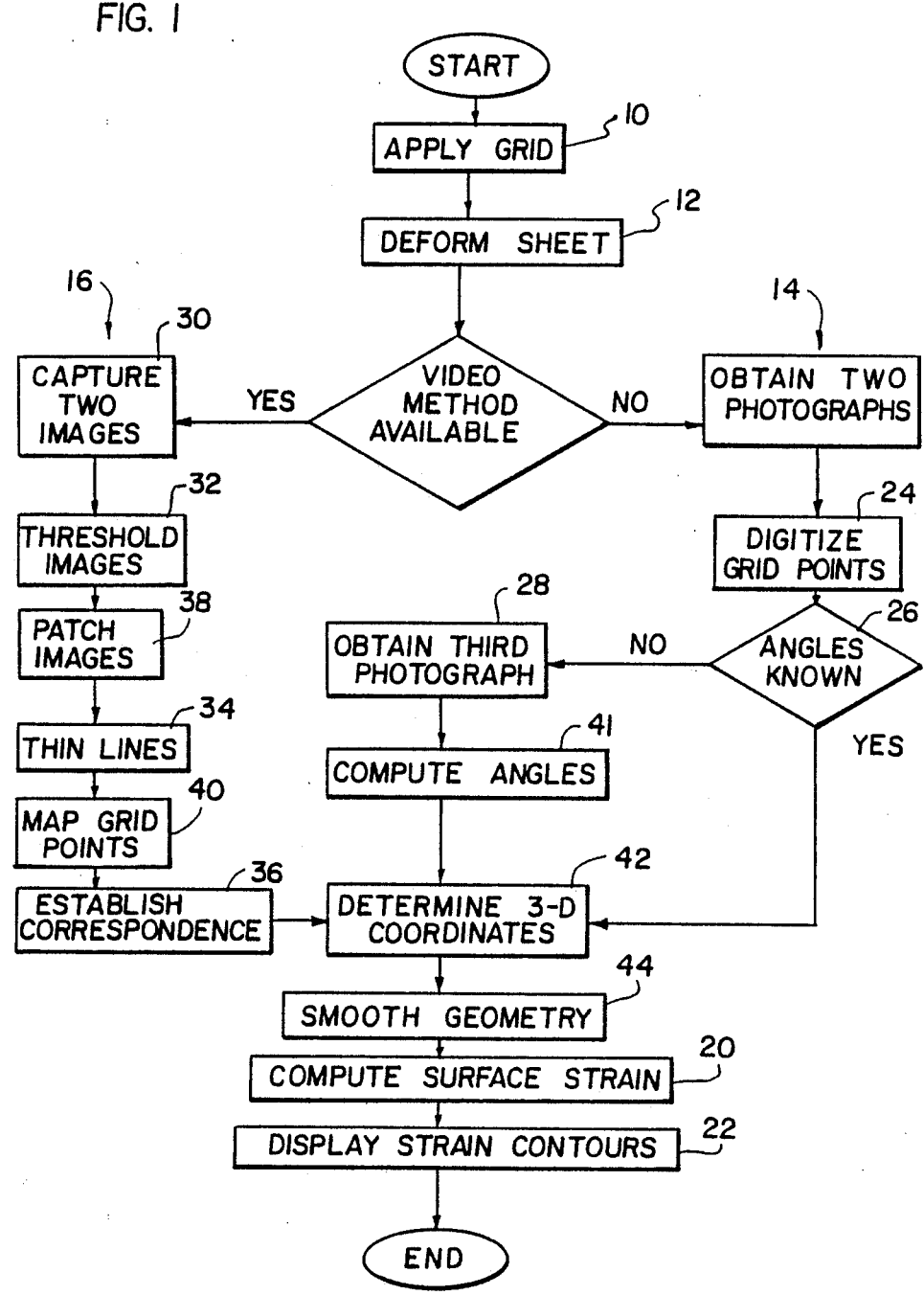
FIG. 1 is a flow chart showing main components of the automated strain measurement system of the present invention.

The strain measurement system of the present invention includes several stages as shown in the embodiment of FIG. 1. The first stage 10 is the application of a uniform square grid pattern to the sheet before it is deformed. This may be accomplished by electrochemical etching for steel and aluminum sheets, or by silk screening a grid onto plastics. Once the sheets have been formed into the desired shape at stage 12, the intersecting grid lines on the surface of the part are located and stored in a computer by one of two methods: manual digitization of two enlarged photographs of the image, generally designated 14; or automatic image processing of digital representations of the images, generally designated 16. The three-dimensional geometry and surface strain components are computed from the two sets of coordinate pairs, and the geometrical relationship between the two views is obtained. Finally, the principal strains are computed at 20 and displayed at 22 on the deformed geometry with a color contour display.

The unique contributions of this measurement system are the means of determining coordinate points from the image using digital image processing and of computing the three-dimensional coordinates from two sets of two-dimensional coordinate pairs by establishing the correspondence of individual points in the two views. The computation of strains from measured deformed nodal coordinates has been described in general form in "The Modelling of Sheet Metal Stampings", (Intern. J. of Mech. Sci., Vol. 28, 1986, pp. 416–430) by Sowerby, et al. The equations for the case of an initially square grid are presented here.

Figure 2:
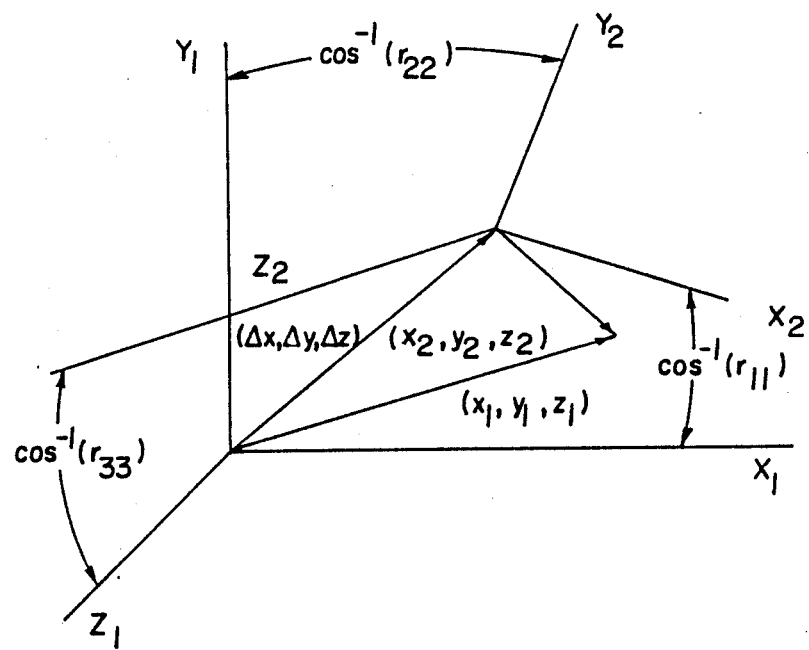
FIG. 2 is a graphic illustration of the initial and final coordinate points used in a rigid body transformation according to the present invention.

Two views of any set of points located on a rigid body may be related in general by rotations about the three coordinate axes and translations along the same axes, illustrated in FIG. 2. In matrix notation:

$$\begin{pmatrix} x_2 \\ y_2 \\ z_2 \end{pmatrix} = \begin{bmatrix} r_{11} r_{12} r_{13} \\ r_{21} r_{22} r_{23} \\ r_{31} r_{32} r_{33} \end{bmatrix} \begin{pmatrix} x_1 \\ y_1 \\ z_1 \end{pmatrix} + \begin{pmatrix} \Delta x \\ \Delta y \\ \Delta z \end{pmatrix} \quad (1)$$

where
- $(x_1, y_1, z_1)$ are the initial coordinates of a point;
- $(x_2, y_2, z_2)$ are the final coordinates of the same point;
- $r_{ij}$ are the direction cosines of the rotations; and
- $(\Delta x, \Delta y, \Delta z)$ are the translations.

In particular, this relationship may be defined in terms of rotation about an axis which intersects the viewing axis at known angles and distances from the camera lens in each of the two views. The detailed equations for this are set forth later.

To account for the characteristics of the lens, an ideal lens model is used where the only parameter needed is the focal length. The optical behavior of the lens is given by:

$$(z'-f)(z-f)=f^2 \quad (2)$$

where the primed coordinate refers to the object's image on the focal plane, i.e., z' is the distance from the lens to the focal plane, and f is the focal length of the lens. Rearranging Eq. 2, we obtain $$\frac{z'}{z} = \frac{f}{z-f} \quad (3)$$

Defining a coordinate system with the z-axis along the viewing axis and the origin at the center of the lens, the coordinates of the object's image on the focal plane are related to the actual coordinates of the object by the following equations:

$$\frac{z'}{z} = \frac{y'}{y} = \frac{x'}{x} \quad (4)$$

It should be noted that the signs of the image coordinates are opposite the signs of the object coordinates with respect to the same coordinate system. Care must be taken to ensure that the correct signs are used when the signs of the image coordinates x' and y' are reversed by the camera.

Combining Eq. 3 with Eq. 4 gives the following relationships, valid for each view, between the actual coordinates of the points and the corresponding image coordinates image coordinates on the focal plane:

$$x_i = x_i' \frac{z_i - f}{f} \tag{5}$$

$$y_i = y_i' \frac{z_i - f}{f}$$

Substituting Eqs. 5 into Eq. 1 results in a set of three equations with two unknowns, $z_1$ and $z_2$. Solving the third row for $z_2$ and substituting into the first two rows gives two equations that may be independently solved for $z_1$ in terms of the measured camera image coordinates (x'$_1$, y'$_1$, x'$_2$, y'$_2$), the focal length of the lens (f), and the rotations ($r_{ij}$) and translations ($\Delta x$, $\Delta y$, $\Delta z$). The equations are:

$$z_{1a} = \frac{x_2'(r_{31}x_1' + r_{32}y_1' - \Delta z)/f - (r_{11}x_1' + r_{12}y_1') + x_2' + \Delta x}{x_2'(r_{31}x_1' + r_{32}y_1' + r_{33}f)/f^2 - (r_{11}x_1' + r_{12}y_1')/f + r_{13}} \tag{6}$$

$$z_{1b} = \frac{y_2'(r_{31}x_1' + r_{32}y_1' - \Delta z)/f - (r_{21}x_1' + r_{22}y_1') + y_2' + \Delta y}{y_2'(r_{31}x_1' + r_{32}y_1' + r_{33}f)/f^2 - (r_{21}x_1' + r_{22}y_1')/f + r_{23}}$$

If there is no measurement error, these two equations will give the same result. When measurement error exists, Eq. 6 may be combined to give a better estimate of the actual value of $z_1$. Letting $$z_1 = R z_{1a} + (1-R) z_{1b} \tag{7}$$

and assuming the measurement errors are the same magnitude in each direction in each view and independent of each other, R may be chosen to minimize the estimate of the squared error in $z_1$. For large focal length compared to the size of the image coordinates x' and y', the value of R which approximately minimizes the error, is given as $$R = \frac{(r_{13}(1 + r_{21} + r_{22}))^2}{(r_{23}(1 + r_{11} + r_{12}))^2 + (r_{13}(1 + r_{21} + r_{22}))^2} \tag{8}$$

The coordinates $x_1$ and $y_1$ are then given by Eq. 5 to give a complete description of the three-dimensional coordinates of each point in view 1; the same approach may be used to obtain the coordinates in the other view.

In summary, the following information is needed to compute the coordinates of a set of points:

(a) Two sets of two-dimensional image coordinates, with a one-to-one correspondence between the points of each set.

(b) The rotations $r_{ij}$ and translations ($\Delta x$, $\Delta y$, $\Delta z$) that relate the two views. (Note that the $r_{ij}$ may not all be zero, or the equations become singular.)

(c) The focal length of the camera.

Two methods have been developed for obtaining the required sets of image coordinates and establishing the correspondence between each pair of coordinates in one view with the coordinate pair in the second view that refers to the same point. The first method involves taking photographs and manually digitizing them. The second method uses a video camera and computer interface to automatically digitize the images, with a limited amount of assistance from the user. The photographic method has the advantage of simplicity and smaller initial investment in equipment, while the second method is limited by the camera system resolution in terms of the number of grid points in one view that may be accurately located, but avoids the tedium of manually identifying each point and is therefore much faster as well as much less sensitive to user error.

Manual Photographic Method

The basic procedure in this method is to take photographs of the deformed part or region of interest of the part, from two views, enlarge the photographs sufficiently to allow the operator to accurately identify the locations of the intersection points, and then to locate each point of interest with a digitizing tablet (stage 24 in FIG. 1). For each photograph, it is necessary to identify the distance from the camera lens to some point of reference for the part being measured, the motion of the part with respect to its reference axes, and the angle between the viewing axis and the axis of rotation of the part. It should also be noted that this last angle (26 in FIG. 1) must not be zero in both views or the calculations will fail.

An alternative to measuring the motion of the part and angle of the viewing axis has also been developed to avoid the equipment necessary to accurately measure these parameters. This option requires the user to take a third photograph (28 in FIG. 1) from another distinct viewing axis, digitize at least four points (as widely spaced as possible) in this third view, and identify the points in the other two views to which these points correspond. In addition, the user must include in each photograph a scale or reference length perpendicular to the viewing axis and at approximately the same distance as the part from the camera, and digitize this distance along with the coordinate points. Once the user supplies an initial estimate of the angles relating the three views, an optimization procedure is invoked which calculates how nearly the two-dimensional projections of the points in one view match up with the corresponding points after applying the rotations, and minimizes the sum of squares of these two-dimensional distances (41 in FIG. 1).

Figure 3A:
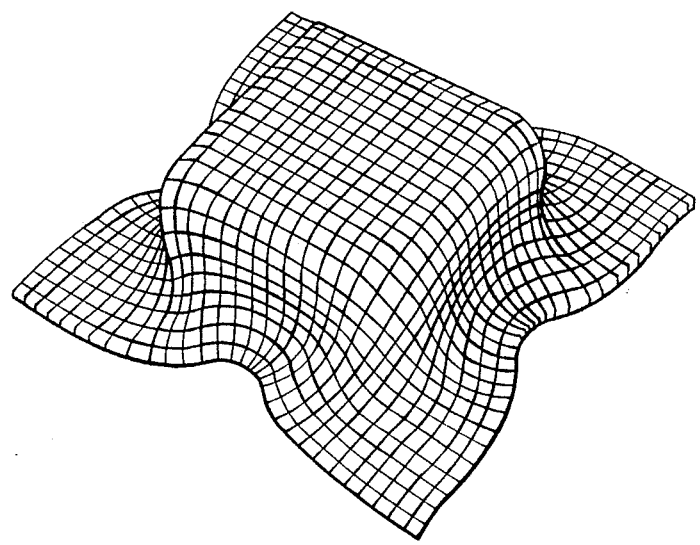
FIG. 3a is a perspective view of an EIDQ steel square cup which had been provided with a grid before deformation, having an initial blank size of 90 mm on a side.
Figure 3B:
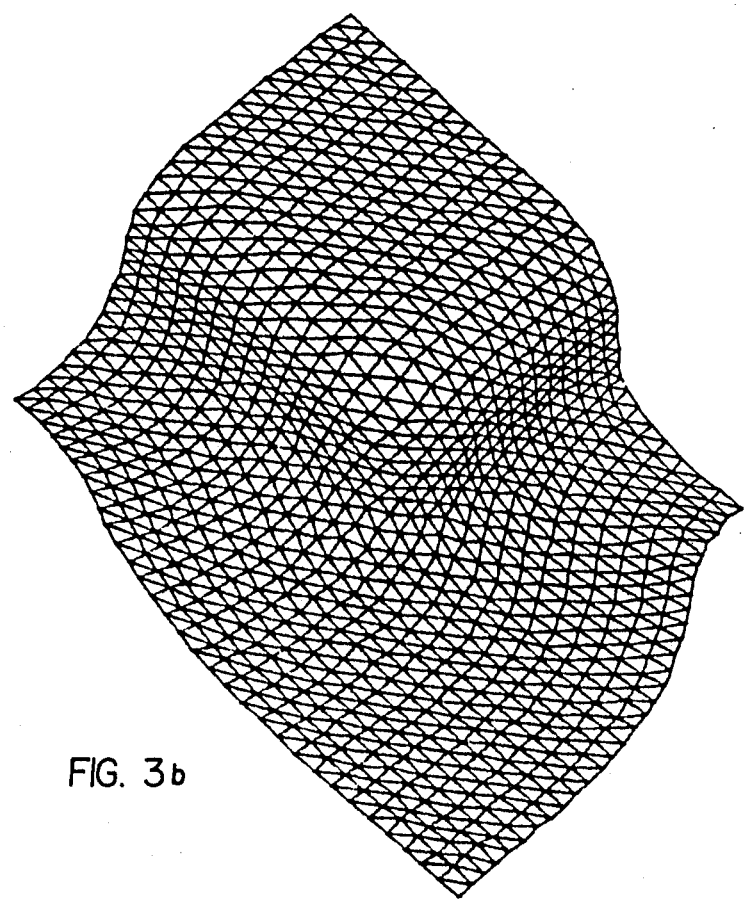
FIG. 3b is a triangle mesh of a quadrant of the image taken from the square cup of FIG. 3a, where each quadrilateral is divided into two triangles and the manual photographic method of the invention is utilized.

FIG. 3a shows a grid on a EIDQ steel plate which was formed into a square cup. A quarter of the part surface was digitized, and the digitized mesh obtained is shown in FIG. 3b. The resulting triangular mesh (each quadrilateral divided into two triangles) was obtained from photographs and the manual photographic method.

Automated Vision Method

Figure 4:
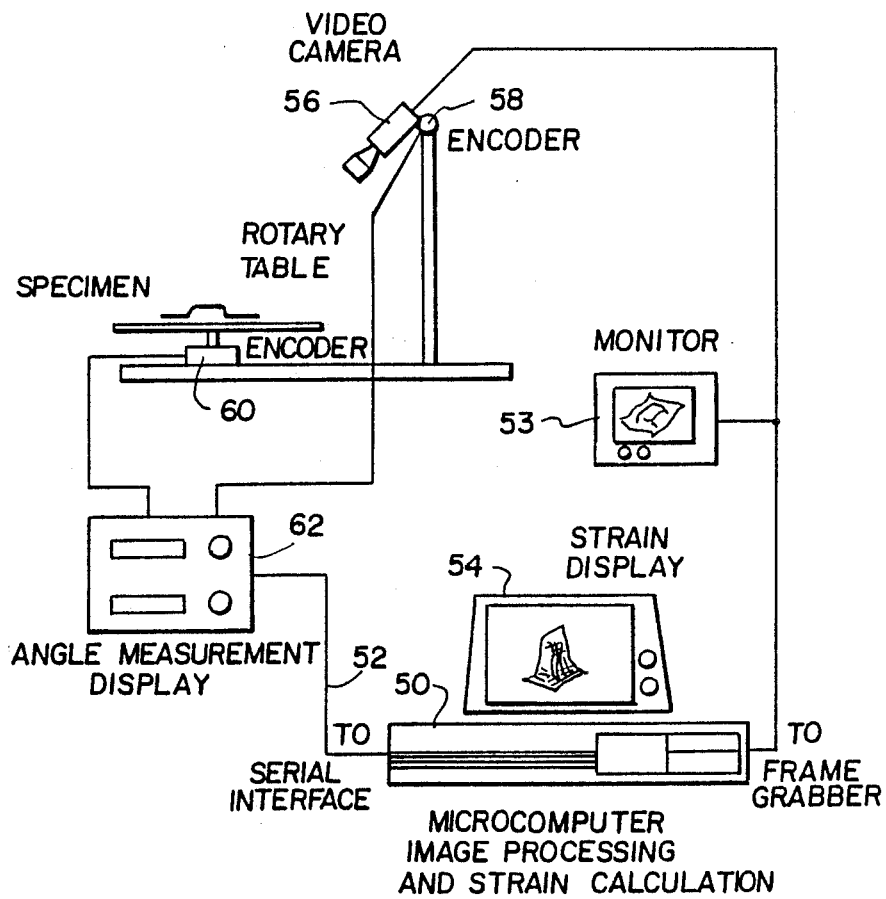
FIG. 4 is a schematic diagram showing major components of the invention embodied as an automated visual method.

In this approach, the two views are obtained with a video camera 56, monitor 53, and a frame grabber, so that the image is stored by the computer 50 (stage 30 in FIG. 1). The hardware components of the complete measurement system are shown in FIG. 4, including the devices 58, 60 and 62 used for automatically measuring the angles.

There are several steps required for the computer to automatically locate the grid points from the stored images, consisting of thresholding (32), line thinning (34), computing intersections (38, 34, 40), and establishing correspondence (36) between the points in the two views.

Before the image can be accurately thresholded, two filters are applied to the image: an averaging filter to reduce noise in the image; and a high pass convolution to equalize the average brightness level over the entire surface. These filters multiply the brightness value of every pixel in the neighborhood of a given pixel by the corresponding element of the convolution kernel and replacing the brightness value at the center pixel with the sum. The following convolution kernel has been found to work well in removing trends in the image brightness, although a larger kernel could provide even better results:

```
-2 -2 -1 -1 -1 -2 -2
-2 -1 -1 -1 -1 -1 -2
-1 -1  1  2  1 -1 -1
-1 -1  2 40  2 -1 -1
-1 -1  1  2  1 -1 -1
-2 -1 -1 -1 -1 -1 -2
-2 -2 -1 -1 -1 -2 -2
```

The result of this convolution is an image with an average brightness of zero throughout the image, so that the thresholding level of zero works well for most images.

Once the image is in binary form with lines and spaces represented as ones and zeros, it may require patching (38 in FIG. 1) by the user to ensure that the grid lines are unbroken, since the following algorithms are based on that assumption. This patching is accomplished with a program that uses a mouse as a sort of paintbrush to fill in missing parts of lines and erase extra pieces of lines. This program is also used to define the boundaries of the region that will be computed, since the two images may include a different number of grid points near their edges.

The next step in this automatic method is the application of a line thinning algorithm (34) which reduces each line to a line one pixel wide, while maintaining continuity. There are many such algorithms described in the literature, e.g. Arcelli, C., and G. Sanniti di Baja, "Medial Lines and Figure Analysis", *Proc. 5th International Conference on Patter Recognition,* Miami Beach, 1980, pp. 1016; and Arcelli, C., "Pattern Thinning by Contour Tracing", *Computer Graphics and Image Processing,* Vol 17, 1981, pp. 130-144. The technique used was very simple, thinning each line by one pixel on each side for each pass, and requiring as many passes as half the line width at its thickest point. While this method may not be free of bias, it is easy to implement and appears to be adequate.

Figure 5:
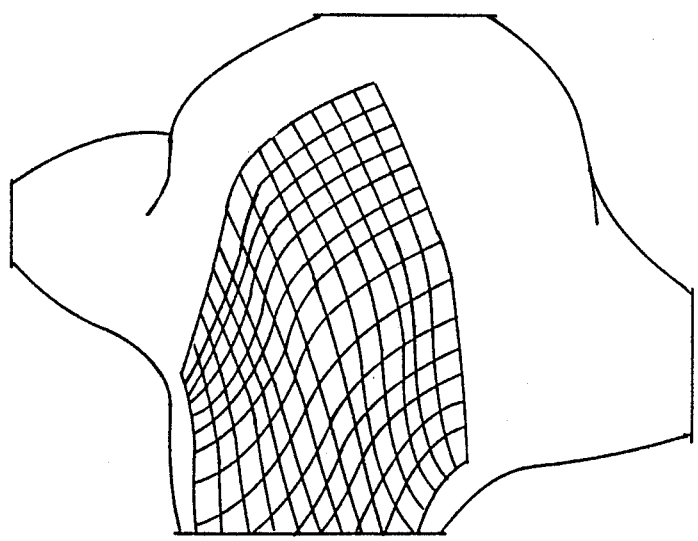
FIG. 5 is a computer screen image showing a quadrant of a quadrilateral mesh fit to the image taken of a three dimensional square cup, using the two sets of two-dimensional coordinates in accordance with the present invention.

Once the thinned lines are obtained, a mapping algorithm is applied to locate points (40 in FIG. 1) where the lines branch, and which follows the line segments from one branch point to the next. By choosing the leftmost (or rightmost) segment at each branch point, the starting point is eventually reached and a closed polygon is obtained which corresponds to one of the originally square grids on the surface of the part. A quadrilateral is mapped to each polygon by choosing midpoints of pairs of three-segment branch points as grid points, pairing midpoints in various combinations until the best fit is found. For each polygon after the first, the algorithm chooses polygons bordering on previously computed quadrilaterals so as to greatly reduce the possible pairings of branch points that need to be considered. In this way each quadrilateral in the region is mapped, so that not only the two-dimensional coordinates but also the locations of nearest neighbors are known for every grid point. A display of the mesh superimposed on the thinned image is shown in FIG. 5.

After the mapping algorithm has been applied to both sets of points, the next step is to establish the correspondence between coordinate pairs in each view that refer to the same grid point on the surface. The user is asked to choose a corner point in one view, and then to identify the corresponding point in the other view. From this information, the program identifies neighboring nodes in each view which must correspond to each other, and proceeds to establish correspondence for the entire set of points. This algorithm uses the fact that the mapping algorighm was designed to identify neighbors in the same order (e.g. counter-clockwise) for each point.

With the correspondence between points in each set established, the coordinates are computed by Eqs. 5 and 7 given previously and as shown in stage 42 in FIG. 1. The surface is then smoothed (stage 44) to reduce the effect of measurement error, based on the fact that the actual surface is known to be smooth and the grid points were initially uniformly spaced. ( A smoothing algorithm has been developed which does a least squares fit of each coordinate (x, y, z) separately as a linear function of the original (evenly spaced) x and y values. For interior points, the solution reduces to replacing the coordinate at the selected point with the average of the coordinate values over a centered neighborhood around the point. The equations for both the interior points and the slightly more complicated case of points on an edge are given later. The surface strains are then calculated (stage 20) from the coordinates in the manner described in the next section.

Strain Calculation

The calculation of surface strains from the known coordinates of a deformed grid given its initial shape is described elsewhere (e.g. the Sowerby et al. article "The Modelling of Sheet Metal Stampings" mentioned above) but the equations are repeated here in detail for the case of an initially square grid. The equations can be generalized to handle any points in sets of three with known initial shape.

The first step is to divide the surface into triangular regions, and this is accomplished by breaking each quadrilateral identified by the coordinate measuring process into two triangles. To simplify the computation of the strain, each quadrilateral is divided in the same direction. In each triangle, the strain is assumed to be homogeneous and proportional with no shear strains out of the plane of the sheet. One set of initially parallel grid lines are chosen to correspond to the original x-direction, and the other set to the original y-direction, so that each triangle corresponds to an originally right triangle with one leg parallel to the x-axis and the other parallel to the y-axis. The geometry of the deformed triangle is defined in FIG. 6.

The strains may be computed in terms of principal stretch ratios and angle changes, (see Malvern, L. E., *Introduction to the Mechanics of a Continuous Medium,* Prentice-Hall, Englewood Cliffs, NJ, 1969, pp. 164ff) which are easy to compute with these geometry definitions. The relationship between the Green deformation tensor C and the stretch ratio is given as:

$$\left(\frac{ds}{dS}\right)^2 = N'CN \qquad (9)$$

where
- ds/dS is the stretch ratio, defined as the ratio of the initial length to the final length of a line element, and
- N is the unit vector in the direction of dS, with N' its transpose.

For the leg of the triangle originally parallel to the x-axis,

N'=[1 0 0]

so the (uniform) stretch along that line is $$\left(\frac{ds}{dS}\right)^2 = C_{11} \qquad (10)$$

Figure 6:
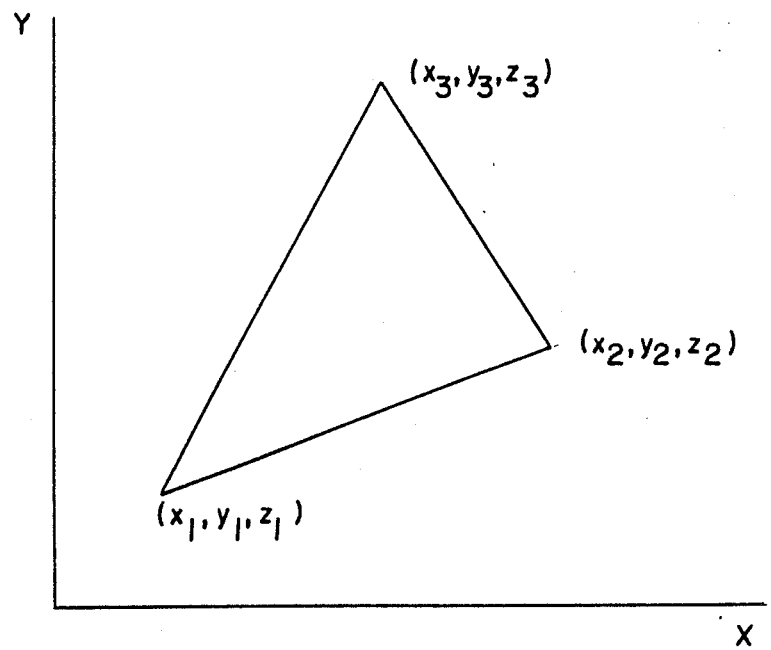
FIG. 6 is a graph showing the geometry definition of the strain calculation in accordance with the present invention.

Referring to FIG. 6, and letting D be the original length of a side of a square, $$C_{11} = \frac{(x_2 - x_1)^2 + (y_2 - y_1)^2 + (z_2 - z_1)^2}{D^2} \qquad (11)$$

Likewise, $$C_{22} = \frac{(x_3 - x_1)^2 + (y_3 - y_1)^2 + (z_3 - z_1)^2}{D^2} \qquad (12)$$

The Lagrangian strain tensor E is related to the Green deformation tensor by C=1+2E:

$$E_{11} = \frac{(x_2 - x_1)^2 + (y_2 - y_1)^2 + (z_2 - z_1)^2 - D^2}{2D^2} \qquad (13)$$

$$E_{22} = \frac{(x_3 - x_1)^2 + (y_3 - y_1)^2 + (z_3 - z_1)^2 - D^2}{2D^2}$$

The shear component of the strain is related to the angle between two material elements whose initial configuration is known. In terms of the Green deformation tensor, $$\cos(\eta_1,\eta_2) = \frac{N_1'CN_2}{\sqrt{N_1'CN_1}\sqrt{N_2'CN_2}} \qquad (14)$$

where
- $N_1$, $N_2$ are original unit vectors
- $n_1$, $n_2$ are final unit vectors of the same material elements.

Since the x-axis and y-axis were chosen to correspond to the original grid lines, the original unit vectors are $N'_1$=[1 0 0]

$N'_2$=[0 1 0]

Equation 14 becomes $$\frac{C_{12}}{\sqrt{C_{11}}\sqrt{C_{22}}} = \frac{(x_2 - x_1)(x_3 - x_1) + (y_2 - y_1)(y_3 - y_1) + (z_2 - z_1)(z_3 - z_1)}{\sqrt{(x_2 - x_1)^2 + (y_2 - y_1)^2 + (z_2 - z_1)^2}\sqrt{(x_3 - x_1)^2 + (y_3 - y_1)^2 + (z_3 - z_1)^2}} \qquad (15)$$

Substituting Eqs. 11 and 12 into Eq. 15, gives the following result:

$$C_{12} = \frac{(x_2 - x_1)(x_3 - x_1) + (y_2 - y_1)(y_3 - y_1) + (z_2 - z_1)(z_3 - z_1)}{D^2} \qquad (16)$$

The Lagrangian shear strain component is then given (noting symmetry) as $$E_{12} = E_{21} = \frac{(x_2 - x_1)(x_3 - x_1) + (y_2 - y_1)(y_3 - y_1) + (z_2 - z_1)(z_3 - z_1)}{2D^2} \qquad (17)$$

With the surface strain components of the Lagrangian strain tensor given by Eqs. 13 and 17, the corresponding principal strains can be computed as follows:

$$E_{1,2} = \frac{E_{11} + E_{22}}{2} \pm \sqrt{\left(\frac{E_{11} - E_{22}}{2}\right)^2 + E_{12}} \qquad (18)$$

Since the principal stretch ratios are related to the principal strains by $(l/l_o)^2 = C_{1,2} = 1 + 2E_{1,2}$, the corresponding logarithmic strains may be computed from the principal stretch ratios and expressed in terms of the principal Lagrangian strains $$\epsilon_{1,2} = \ln\left(\frac{l}{l_0}\right) = \ln\sqrt{1 + 2E_{1,2}} \qquad (19)$$

Additional information is now provided concerning various details of the invention:

In order to arrive at the expressions for $r_{ij}$ and ($\Delta x$, $\Delta y$, $\Delta z$) from equation 1, it is convenient to use homogeneous transformations to perform both rotations and translations. Assume that the measured object rotates about the z-axis by a in a coordinate system which has its original at the point ($dx_1$, $dy_1$, $dz_1$) in view 1 and at ($dx_2$, $dy_2$, $dz_2$) in view 2, measured in the coordinate system fixed to the camera lens. Let the angle between the two coordinate system's z-axes be $\beta_1$ in view 1 and $\Delta_2$ in view 2. The following matrices may be concatenated to give the relationship between the coordinates of the object in the camera's system in the two views:

$$\begin{pmatrix} x_2 \\ y_2 \\ z_2 \\ 1 \end{pmatrix} = \begin{bmatrix} 1 & 0 & 0 & -dx_2 \\ 0 & \cos\beta_2 & \sin\beta_2 & -dy_2 \\ 0 & -\sin\beta_2 & \cos\beta_2 & -dz_2 \\ 0 & 0 & 0 & 1 \end{bmatrix} \begin{bmatrix} \cos\alpha & -\sin\alpha & 0 & 0 \\ \sin\alpha & \cos\alpha & 0 & 0 \\ 0 & 0 & 1 & 0 \\ 0 & 0 & 0 & 1 \end{bmatrix} \qquad (20)$$

$$\begin{bmatrix} 1 & 0 & 0 & 0 \\ 0 & \cos\beta_1 & -\sin\beta_1 & 0 \\ 0 & \sin\beta_1 & \cos\beta_1 & 0 \\ 0 & 0 & 0 & 1 \end{bmatrix} \begin{bmatrix} 1 & 0 & 0 & dx_1 \\ 0 & 1 & 0 & dy_1 \\ 0 & 0 & 1 & dz_1 \\ 0 & 0 & 0 & 1 \end{bmatrix} \begin{pmatrix} x_1 \\ y_1 \\ z_1 \\ 1 \end{pmatrix}$$

Multiplying these matrices, the rotations $r_{ij}$ re found as the first three elements of the first three columns:

$$r_{ij} = \begin{bmatrix} \cos\alpha & -\sin\alpha\cos\beta_1 & \sin\alpha\sin\beta_1 \\ \sin\alpha\cos\beta_2 & \cos\alpha\cos\beta_1\cos\beta_2 + \sin\beta_1\sin\beta_2 & -\cos\alpha\sin\beta_1\cos\beta_2 + \sin\beta_2\cos\beta_1 \\ -\sin\alpha\sin\beta_2 & -\cos\alpha\cos\beta_1\sin\beta_2 + \sin\beta_1\cos\beta_2 & \cos\alpha\sin\beta_1\sin\beta_2 + \cos\beta_1\cos\beta_2 \end{bmatrix}$$

The translations ($\Delta x$, $\Delta y$, $\Delta z$) appear as the first three elements of the last column:

$\cos\alpha dx_1 + \sin\alpha\cos\beta_1 dy_1 + \sin\alpha\sin\alpha_1 dz_1 - dx_2$ $\sin\alpha\cos\beta_2 dx_1 + (\cos\alpha\cos\beta_1\cos\alpha_2 + \sin\beta_1\sin\beta_2)dy_1 + (\cos\beta_1\sin\beta_2 - \cos\alpha\sin\beta_1\cos\beta_2)dz_1 - dy_2$ $\sin\alpha - \sin\beta_2 dx_1 + (\sin\beta_1\cos\beta_2 - \cos\alpha\cos\beta_1\sin\beta_2)dy_1 + (\cos\beta_2 + \cos\alpha\sin\beta_1\sin\beta_2)dz_1 - dz_2$ The smoothing algorithm used in stage 44 of FIG. 1 assumes that each coordinate on the deformed surface is a smooth function of the original coordinates of the grid points. Since the original coordinates are equally spaced in both directions, that spacing is assigned to be one unit, and the linear function of these coordinates that is fit to the surface is as follows:

$$x'_{ij} = a_0 + a_1 i + a_2 \tag{21}$$

where i and j are the original two coordinates with respect to a local origin. Following a least squares approach, he error that is to be minimized is:

$$E = \Sigma (x_{ij} - x'_{ij})^2 \tag{22}$$

Taking partial derivatives of E with respect to each of the coefficients $a_0$, $a_1$, $a_2$ results in three equations which may be expressed in matrix notation as $$\begin{bmatrix} \Sigma 1 & \Sigma i & \Sigma j \\ \Sigma i & \Sigma i^2 & \Sigma ij \\ \Sigma j & \Sigma ij & \Sigma j^2 \end{bmatrix} \begin{pmatrix} a_0 \\ a_1 \\ a_2 \end{pmatrix} = \begin{pmatrix} \Sigma x_{ij} \\ \Sigma i x_{ij} \\ \Sigma j x_{ij} \end{pmatrix} \tag{23}$$

If we use in the commutation for each interior point the point itself and the four nearest neighbors, Eq. 23 becomes $$\begin{bmatrix} 500 \\ 020 \\ 002 \end{bmatrix} \begin{pmatrix} a_0 \\ a_1 \\ a_2 \end{pmatrix} = \begin{pmatrix} x_{00} + x_{10} + x_{01} + x_{-10} + x_{0-1} \\ x_{10} - x_{-10} \\ x_{01} - x_{0-1} \end{pmatrix} \tag{24}$$

Solving this for the coefficients $a_i$ $$\begin{pmatrix} a_0 \\ a_1 \\ a_2 \end{pmatrix} = \begin{pmatrix} (x_{00} + x_{10} + x_{01} + x_{-10} + x_{0-1})/5 \\ (x_{10} - x_{-10})/2 \\ (x_{01} - x_{0-1})/2 \end{pmatrix} \tag{25}$$

Evaluating this at the center point, $x'_{00}$ is seen from Eq. 25 to b4 simply the average of the points selected. This algorithm is applied independently to the x, y, and z coordinates for each interior grid point.

In order to smooth the geometry at hedges, it is not possible to choose a set of points centered in both directions. For computational efficiency, the same set of points as were used to smooth the nearest interior point at evaluated at the edge. For instance, $$x_{10}' = \frac{x_{00} + x_{10} + x_{01} + x_{-10} + x_{0-1}}{5} + \frac{x_{10} - x_{-10}}{2} \tag{26}$$

Finally, to smooth a corner, the corner point is added to the set of points used for the nearest interior point. If the corner corresponds to $x'_{11}$, Eq. 23 becomes $$\begin{bmatrix} 611 \\ 131 \\ 113 \end{bmatrix} \begin{pmatrix} a_0 \\ a_1 \\ a_2 \end{pmatrix} = \begin{pmatrix} x_{11} + x_{00} + x_{10} + x_{01} + x_{-10} + x_{0-1} \\ x_{11} + x_{10} - x_{-10} \\ x_{11} + x_{01} - x_{0-1} \end{pmatrix} \tag{27}$$

Solving this for the coefficients $a_i$ and evaluating at $x'_{11}$, the result is $$x_{11}' = \frac{12x_{11} + 2x_{00} + 7x_{10} + 7x_{01} - 3x_{-10} - 3x_{0-1}}{22} \tag{28}$$

The equipment shown in FIG. 4 which was assembled to demonstrate and practice the present invention included a 80-Micro 386 computer 50 which is IBM compatible and which included a serial port 52 and an EGA board and monitor 54. A Javelin JE-2062 IR camera 56 was used in conjunction with a Javelin BWM 12 12 inch black and white monitor 53, a frame grabber and software embodied by the PCVISION plus frame grabber and ITEX PCplus software library.

Rotary encoders 58 and 60 were the Teledyne-Gurley 8221-4500-CL-PA 4500. The digital readout for the angle measurement, 62, was a C-Tek MPC-852-1-11-01-01-02 axis display/counter.

In order to estimate the accuracy of the strain measurement method, a set of experiments were conducted with known geometry where the part was rotated about an axis which formed a fixed angle to the camera's viewing axis. For this geometry, it was determined that the part should be rotated at least 30° between views in order to obtain a measurement with 95% confidence that the correct value is within plus or minus 3% strain of the measured value.

The accuracy of the invention was demonstrated to be comparable to prior known techniques for measuring strain, while having the advantage of providing a strain contour over a relatively wide surface of the object being tested.

In accordance with another feature of the present invention, the step of applying the grid pattern, shown at stage 10 in FIG. 1, is accomplished by illuminating the surface, after it has been deformed, with a grid or square network pattern. The pattern is automatically deformed to follow the contours of the deformed surface. Advantageously, the light is either ordinary incoherent light or laser light. For example, a square network of laser light can be projected onto the curved deformed surface. This is followed by utilizing the two-view technique of the present invention to determine coordinate points and define the surface in question.

While the specific embodiments of the invention has been shown and described in detail to illustrate the application of the principles of the invention, it will be understood that the invention may be embodied otherwise without departing from such principles.

What is claimed is:

1. A method of measuring strain distribution on a deformed surface, comprising:
    applying a grid pattern having grid points to the surface, which pattern is deformed by deformation of the surface;
    taking two different images of the deformed surface from two different orientations, there being a geometric relationship between the two images;
    digitizing the grid points of the deformed grid pattern for each image to obtain two sets of two-dimensional coordinates for the grid points;
    correlating the points of one set of coordinates with the corresponding points of the other set of coordinates;
    calculating one set of three-dimensional coordinates for the grid points as a function of the geometric relationship between the two images and of the two sets of two-dimensional coordinates of the correlated grid points; and
    calculating strain distribution over the surface as a function of the three-dimensional coordinates for the grid points, taken in groups of multiple grid points.

2. A method according to claim 1 including using three grid points for each group of grid points used to calculate the strain distribution.

3. A method according to claim 1 including applying the grid pattern before the surface is deformed.

4. A method according to claim 1 including smoothing the geometry of the single set of three-dimensional coordinates for the grid points before calculating the strain distribution over the deformed surface.

5. A method according to claim 1 including applying the grid pattern to the surface before the surface is deformed.

6. A method according to claim 1 including taking the two images by capturing two video images of the deformed surface, storing each video image as data in a computer, supplying a signal to the computer corresponding to the geometric relationship between the two images, and processing the two video images in the computer to enhance the resolution of the grid points.

7. A method according to claim 6 wherein the grid pattern comprises a pattern of intersecting lines with a grid point at each intersection, the processing of the video images including thinning the lines of the grid pattern, computing intersections of the lines of the grid pattern and calculating correspondence between grid points of the two sets of two-dimensional coordinates of the video images.

8. A method according to claim 1 including taking the two images of the deformed surface by taking two photographs of the deformed surface at an angle to each other, and manually digitizing the grid points on each photograph to obtain the two sets of two-dimensional coordinates.

9. A method according to claim 8 including obtaining the angle between the two images by taking a third photograph of the deformed surface at a different angle from the angle between said first mentioned two photographs, digitizing a plurality of points on the third photograph, identifying corresponding grid points of the plurality of points from the third photograph, to grid points of the two sets of two-dimensional coordinates, obtaining a scale quantity perpendicular to a viewing axis for taking each photograph, and calculating the angle between the first two photographs as a function of the scale, and the coordinate points for the corresponding grid points of the three photographs.

10. A method according to claim 9 including obtaining the scale by measuring the distance between a camera for taking each photograph, and the deformed surface.

11. A method according to claim 1 including applying the grid pattern to the surface after the surface is deformed.

12. A method according to claim 11 including applying the grid pattern by shining light carrying the grid pattern onto the surface.

13. A method according to claim 12 wherein the light is laser light.

14. An apparatus for measuring strain distribution over a deformed surface carrying a deformed grid pattern having grid points, comprising:
    means for taking two different images of the deformed surface with the deformed grid pattern thereon from two different orientations, there being a known geometrical relationship between the images;
    means for digitizing the grid points of the deformed grid pattern for each image to obtain two sets of two-dimensional coordinates for the grid points;
    means for calculating one set of three-dimensional coordinates for the grid points of the grid pattern as a function of the two sets of two-dimensional coordinates and the geometrical relationship between the two images; and
    means for calculating the strain distribution over the deformed surface as a function of local groups of plural grid points over the deformed surface.

15. An apparatus according to claim 14 including means for projecting the grid pattern onto the deformed surface after the surface is deformed.

16. An apparatus according to claim 14 wherein said means for taking the two images comprises a photographic camera for taking photographs each corresponding to one of the images, said means for digitizing the grid points comprising a manually operated digitizer for use on each photograph.

17. An apparatus according to claim 16 wherein said digitizer comprises a digitizing tablet.

18. An apparatus according to claim 14 wherein said means for taking the two images comprises a video camera and a moveable platform for carrying the deformed surface and another moveable platform for allowing the video camera to take the two images, said means for digitizing the grid pattern comprising a computer for receiving the video images, digitizing the video images and obtaining the two sets of two-dimensional coordinates for the grid points.

19. An apparatus according to claim 18 wherein said computer includes means for correlating each grid point of one set of two-dimensional coordinates with a corresponding grid point of the other set of two-dimensional coordinates, and means for calculating the one set of three-dimensional coordinates and the strain distribution over the deformed surface.

20. An apparatus according to claim 19 including encoders connected to both said platforms for measuring the angles relating the two images and providing the signals corresponding to the angles, to the computer, and means for manually measuring the distance from the camera to the moveable platform for carrying the deformed surface.

21. An apparatus according to claim 20 wherein said platforms comprise a turntable for turning the deformed surface to form the two video images, and a moveable rotating platform for locating the camera.

* * * * *